United States Patent
Reedijk et al.

(10) Patent No.: US 7,160,057 B2
(45) Date of Patent: Jan. 9, 2007

(54) PROTECTIVE ELEMENT FOR A BREAKWATER OR WAVE-RETARDING CONSTRUCTION

(75) Inventors: Jan Sebastiaan Reedijk, Gouda (NL); Martijn Klabbers, Rotterdam (NL); Markus Muttray, Gouda (NL)

(73) Assignee: HBG Civiel B.V., SC Gouda (NL)

( * ) Notice: Subject to any disclaimer, the term of this patent is extended or adjusted under 35 U.S.C. 154(b) by 27 days.

(21) Appl. No.: 10/521,964

(22) PCT Filed: Jul. 24, 2003

(86) PCT No.: PCT/NL03/00541

§ 371 (c)(1),
(2), (4) Date: Jan. 21, 2005

(87) PCT Pub. No.: WO2004/009910

PCT Pub. Date: Jan. 29, 2004

(65) Prior Publication Data

US 2005/0214075 A1    Sep. 29, 2005

(30) Foreign Application Priority Data

Jul. 24, 2002  (NL) .................................... 1021146

(51) Int. Cl.
  *E02B 3/04*  (2006.01)
(52) U.S. Cl. .............. 405/25; 405/29; 405/34
(58) Field of Classification Search ............. 405/21, 405/25, 29, 34
  See application file for complete search history.

(56) References Cited

U.S. PATENT DOCUMENTS

| 3,252,287 | A | * | 5/1966 | Suzuki | ......... | 405/29 |
|---|---|---|---|---|---|---|
| 3,582,034 | A | * | 6/1971 | Tsuzuki | ......... | 249/10 |
| 3,614,866 | A |  | 10/1971 | Kaneko |  |  |
| 3,753,553 | A | * | 8/1973 | Bockting | ......... | 256/1 |
| 3,759,043 | A |  | 9/1973 | Tokunaga |  |  |
| 4,347,017 | A | * | 8/1982 | Chevallier | ......... | 405/29 |
| 4,902,166 | A |  | 2/1990 | Bores |  |  |
| 5,441,362 | A | * | 8/1995 | Melby et al. | ......... | 405/16 |
| 5,501,546 | A | * | 3/1996 | Dorrell | ......... | 405/25 |
| 5,879,105 | A |  | 3/1999 | Bishop |  |  |
| 6,508,042 | B1 | * | 1/2003 | Kweon et al. | ......... | 52/608 |

FOREIGN PATENT DOCUMENTS

| DE | 198 15 205 | | 10/1998 |
|---|---|---|---|
| FR | 2 734 292 | | 11/1996 |
| GB | 970 199 | | 9/1964 |
| JP | 03183811 | * | 8/1991 |
| NL | 1 016 098 | | 3/2002 |

* cited by examiner

OTHER PUBLICATIONS

E.E.T.:, "Project C-Fix wil tweede fase in" Digitale Nieuwsbrief Van Het Programma E.E.T., 'Online! No. 25, Mar. 27, 2003, XP002267789, Retrieved from the Internet: <URL:httP://www.eet.nl/nleuws/nwsbrf5_2003.htm> retrieved on Jan. 22, 2004!, the whole document.

*Primary Examiner*—Devon Kramer
(74) *Attorney, Agent, or Firm*—Young & Thompson

(57) ABSTRACT

A protective element for a breakwater or wave-retarding construction comprises a body that has at least two opposing projections. The projections are on either side of a flat base and extend transversely thereto. The periphery of the base is non-circular, so that rolling of the protective element under the influence of the beating of the waves is resisted.

18 Claims, 4 Drawing Sheets

PROTECTIVE ELEMENT FOR A BREAKWATER OR WAVE-RETARDING CONSTRUCTION

BACKGROUND OF THE INVENTION

The invention relates to a protective element for a breakwater or wave-retarding construction, comprising a concrete body that has at least two opposing projections.

A protective element of this type is disclosed in NL-A 8903138. Such protective elements are intended for the parts of, for example, breakwaters, dams and the like that are exposed to the beating of the waves. The waves break as soon as they strike the protective elements, with the result that the underlying parts are better protected against the forces of the water.

The protective elements are usually made of concrete. Usually no reinforcement is used on the grounds of durability. Although a reinforcement has a beneficial effect on the strength of the protective element, it nevertheless has the disadvantage that rusting can hardly be prevented, especially in a salty environment. This means that the strength of the protective element has to be provided by the concrete material alone. It is therefore necessary to choose as advantageous as possible a shape for the protective element. Despite the lack of reinforcement, it must nevertheless be possible to ensure adequately high strength by this means.

SUMMARY OF THE INVENTION

The aim of the invention is therefore to provide a protective element of the abovementioned type that has an as advantageous as possible cohesion and strength. Said aim is achieved in that the projections are on either side of a flat base and extend transversely thereto. Preferably, the projections are in the middle of the base. Furthermore, they can have all conceivable shapes; a cylindrical shape and a conical shape are mentioned as examples.

The projections are preferably oriented perpendicularly with respect to the base. Furthermore, the base can have at least one auxiliary projection at the periphery which extends parallel to or in line with the base.

The base as well can have various shapes. A non-circular shape, such that the protective element will not easily start to roll under the influence of the water forces, is preferred. The base is preferably polygonal, preferably rectangular, pentagonal or hexagonal. For ease of production a peripheral shape based on a regular polygon is preferred. There can be an auxiliary projection at each corner of the base.

Just like the base, a projection can have various peripheral shapes. A non-circular shape is preferred because of the resistance to rolling. The periphery of a projection is preferably polygonal. One possibility is that the periphery of a projection is a regular polygon, just like the periphery of the base. If the peripheral shapes are of identical shape, in the case of a polygon with n corners the preference is that the polygon of the projection is turned through the order of 360/2n degrees of an arc with respect to the polygon of the base.

Another preferred embodiment for the shape of the projection is that the end terminates in a flat surface. In this context it is preferable that this surface is virtually perpendicular to a longitudinal axis of the projection.

The material from which the element is made is preferably concrete, which contains at least cement, sand, granulate or gravel and optionally hardeners and/or plasticisers.

Another preferred embodiment of the material is a material that at least consists of a residue from oil refining, sand, rock-like granulate or gravel. Such a material is known under the trade name C-Fix®. This can be compared with a sort of cement-bound concrete, where the cement has been replaced by a residue from oil refining, the melting point of which is above 150° C.

A possible method for producing a protective element using this material is as follows. The material is heated to above the melting point of the residue material from oil refining. This material is introduced into individual shuttering or casting moulds for the base or projections, after which said material is allowed to cool. A protective element is then assembled by locally heating the joining end of a projection and the joining location on the base. The projection and base are then brought together and the join is allowed to cool, as a result of which a permanent join is produced.

Another preferred embodiment of the base of the protective element is that this has two parallel surfaces.

Another possibility for production of a protective element is to produce this in a split shuttering. For this purpose a raised area is made on the ground, after which a split box is placed on this elevation. This box split by a vertical plane has a bottom box which is open at the top and the bottom. The open bottom fits over the elevation in a sealed manner. A top box is attached to the bottom box, which top box can be moved relative to the bottom box.

Material for the element is poured via the open top of the bottom box, as a result of which the base and at least a bottom projection is formed, the bottom of this projection being on the elevation. After the material has set to some extent, material is poured into the top box for the top projection. After all the material has set, the top box is raised a short distance using lifting means, which are between the bottom box and top box, for freeing the material and the box. The bottom box is then lowered a short distance, which is less than the distance travelled by the top box, to free the box. This lowering is effected by known lifting means in the support means, such as legs which are provided with threaded adjustment means. These legs are located below each part of the bottom box. The closure means between the parts of the split box are then unlocked and the parts of the bottom box are removed together with their top box. The box can then be re-used.

BRIEF DESCRIPTION OF THE DRAWINGS

The invention will be explained in more detail below with reference to a few illustrative embodiments shown in the figures.

DESCRIPTION OF THE PREFERRED EMBODIMENTS

Figure 1:
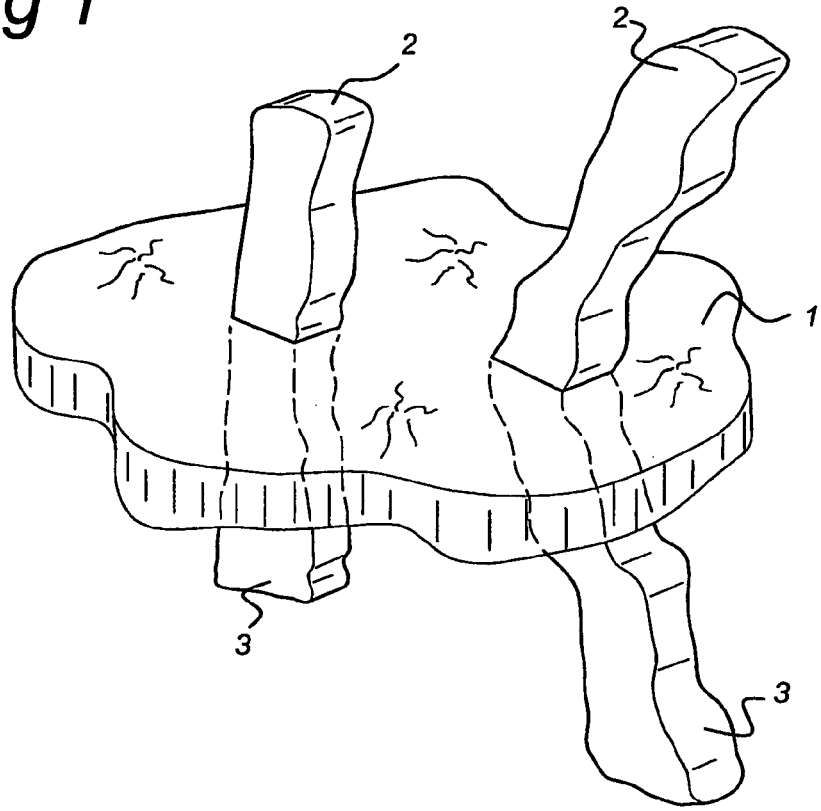
FIG. 1 shows a perspective view of the principle of a protective element according to the invention.
Figure 2:
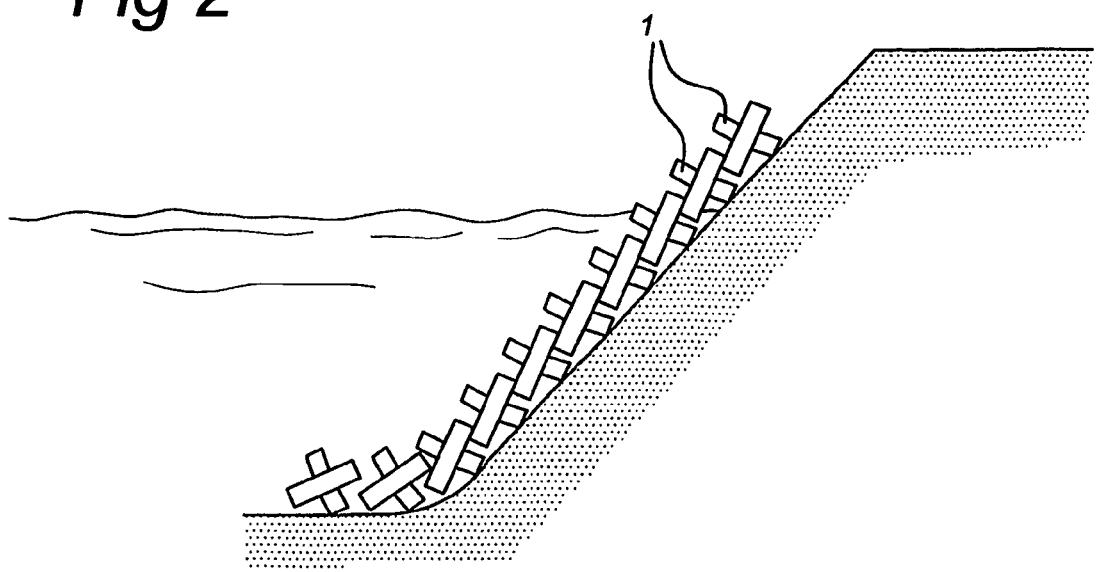
FIG. 2 shows, diagrammatically, an example of the use of the protective element.

FIG. 1 shows the basic principle of a plate-shaped base 1 and top and bottom projections 2 and 3, respectively. FIG. 2 shows protective elements which are situated on an incline of a breakwater.

Figure 3:
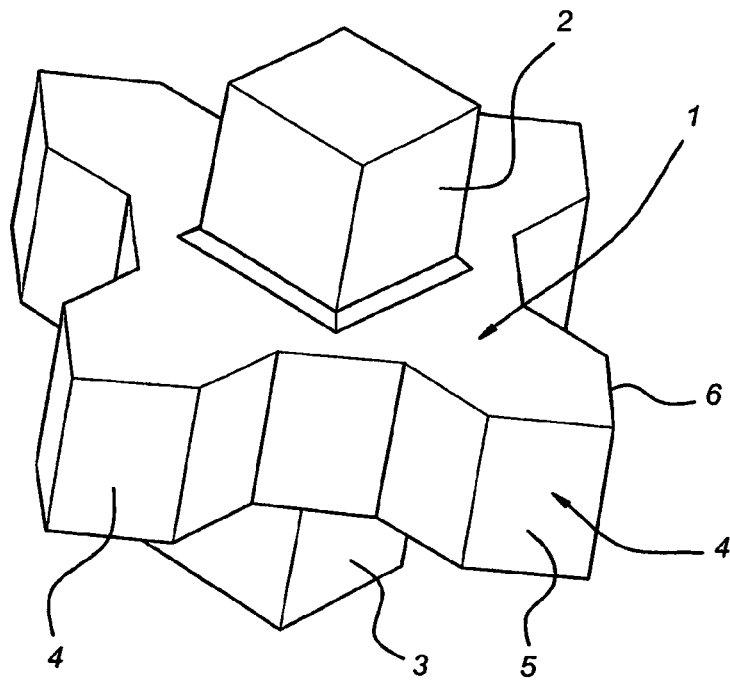
FIG. 3 shows a perspective view of a first illustrative embodiment of the protective element according to the invention.
Figure 4:
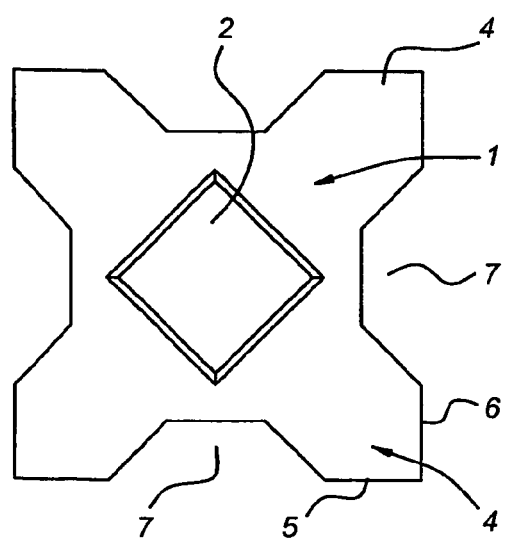
FIG. 4 shows a plan view of the element according to FIG. 1.
Figure 5:
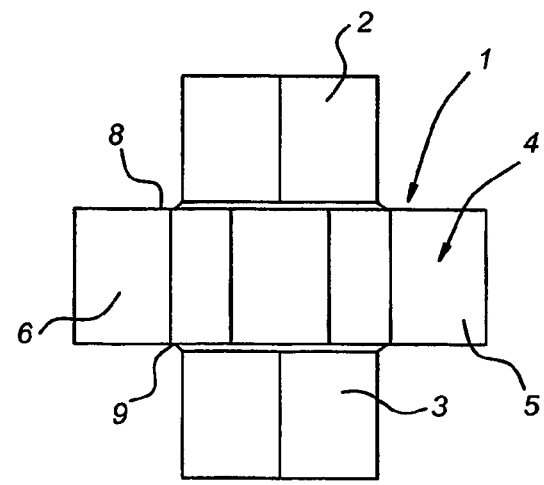
FIG. 5 shows a side view of the element according to FIG. 1.

The protective element for a breakwater shown in FIGS. 3–5 comprises a plate-shaped base 1, indicated in its entirety by 1, on either side of which projections 2 and 3 extend perpendicularly. The base 1 is essentially rectangular and at the four corners has projections 4 which have a pointed shape determined by the sloping surfaces 5, 6.

The projections 4 define recesses 7 between them, through which the water is able to flow freely. The polygonal, in this case square, shape of the base body 1 guarantees high stability.

The base 1 has two surfaces 8, 9 facing away from one another which are parallel to one another.

Figure 6:
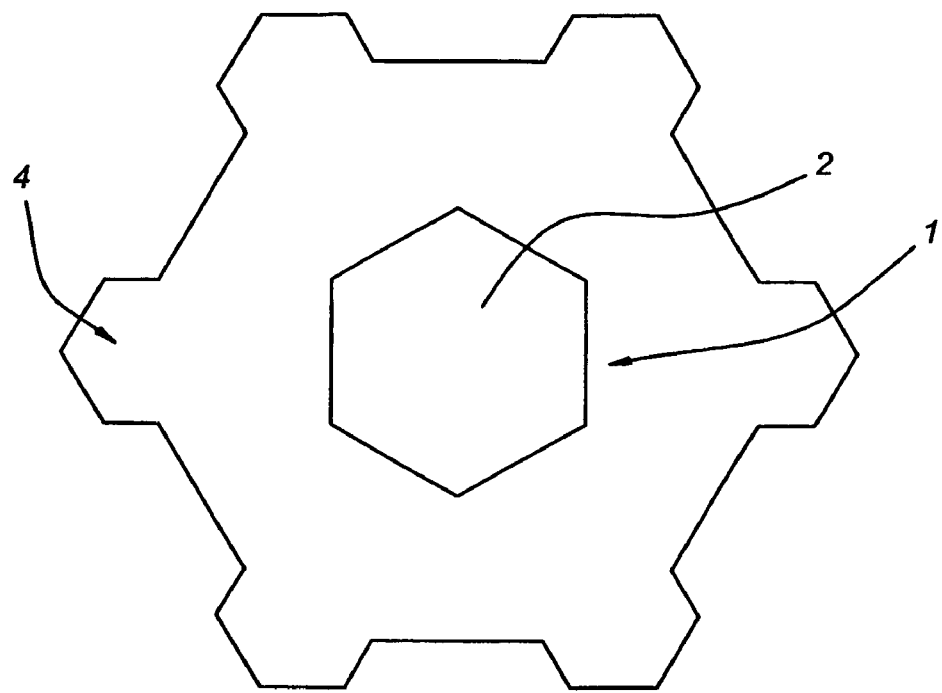
FIG. 6 shows a further embodiment of the protective element according to the invention.

In the embodiment in FIG. 6 a plan view is shown of a hexagonal protective element provided with two hexagonal projections 2 (one can be seen in FIG. 4) as well as six projections 4.

Figure 7:
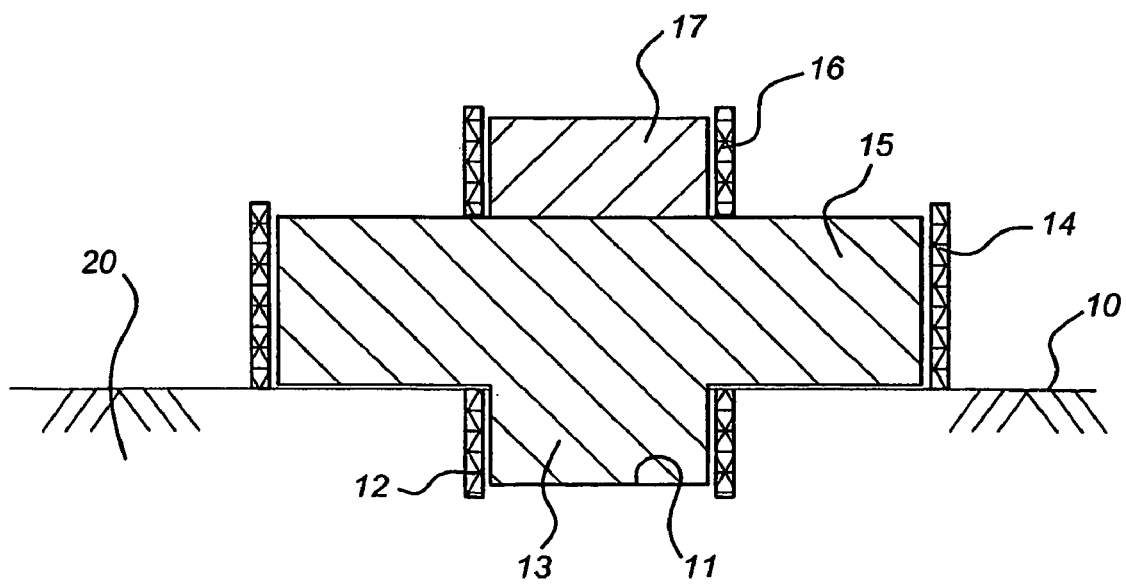
FIG. 7 shows a possible production method.

FIG. 7 shows a possible method for the production of a protective element according to the invention. For this purpose a first recess 11, defined by shuttering 12, is made in a substrate 20. A first quantity of concrete 13 is poured into this shuttering 12, up to ground level 10, to form a first projection of the protective element to be produced.

A second shuttering 14 is produced on the ground 10, into which a second quantity of concrete 15 is then poured to produce the base. It is also possible to wait until the second shuttering 14 has been produced on the ground 10 before pouring the first quantity of concrete 13. The quantity of concrete 13 and 15 can then be poured in a single operation, as a result of which the bottom projection and the base are produced at the same time.

After this base has set to some extent, third shuttering 16 is placed on top of this to receive a quantity of concrete 17 that is to form the top projection.

After the quantities of concrete 13, 15, 17 have set, the protective element is complete.

Figure 8A:
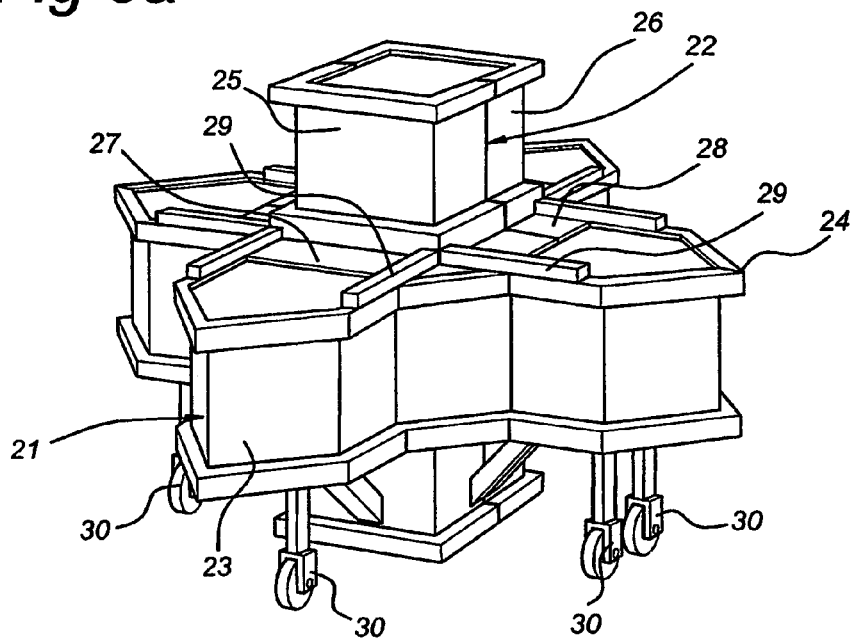
FIG. 8 shows a possible variant of split shuttering for the production of a protective element.
Figure 8B:
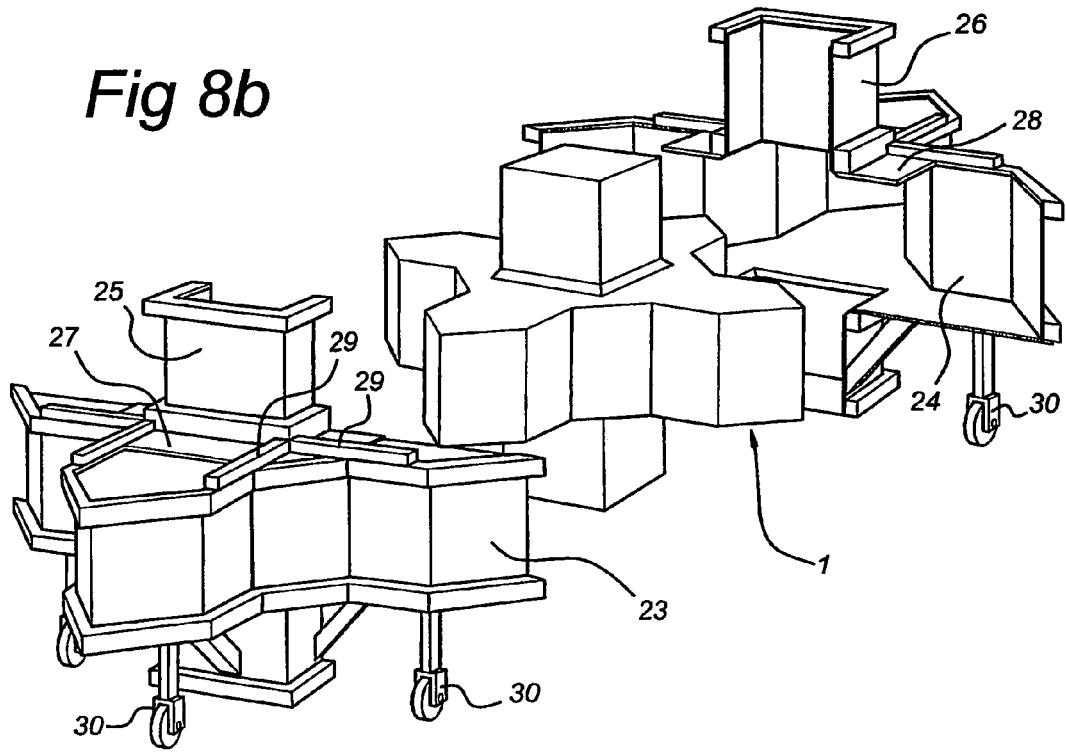

FIG. 8 shows another shuttering for the production of an element from FIG. 3–5. This shuttering consists of two halves split by a vertical plane. FIG. 8a shows a box in the closed state, in which the element will be released from the box. The bottom box 21 consists of a left-hand bottom box 23 and a right-hand bottom box 24, which are open at the top and at the bottom. The top box 22 connected to the bottom box 22 by the connecting means 29 consists of a left-hand top box 25 and a right-hand top box 26. Lifting means are incorporated in the connecting means 29 to enable the top box to be lifted with respect to the bottom box. At least three support means 30 are positioned below the bottom box, which support means can be provided with wheels. Known lifting means are incorporated in the support means 30 to enable the bottom box to be lowered. The bottom of the top box is provided with a left-hand and a right-hand apron 27 and 28, respectively, which lies on the top of the poured material for the base of the element and ensures good abutment and correct rounding-off between base and top projection. The poured element 1 with the left-hand and right-hand half of the shuttering removed can be seen in FIG. 8b.

The invention claimed is:

1. A protective element, comprising:
a substantially square base with opposite planar sides;
two primary projections that each extend from a different respective one of said opposite planar sides; and four auxiliary projections that each extend from a different, respective corner of said substantially square base and that are spaced apart from each other by substantially equally sized recesses, each of said four auxiliary projections extending in a direction of a diagonal of said base crossing the respective corner and having opposite faces that are each substantially parallel to a respective said planar side of said substantially square base,
said protective element being heavier than water and constructed and arranged to rest on a feature to be protected from breaking waves.

2. The protective element of claim 1, wherein said primary projections are each in a middle of the respective one of said opposite planar sides.

3. The protective element of claim 1, wherein said primary projections extend opposite one another.

4. The protective element of claim 1, wherein said primary projections are oriented substantially perpendicular to said opposite planar sides.

5. The protective element of claim 1, wherein said primary projections have peripheries that are non-circular.

6. The protective element of claim 5, wherein the peripheries of said primary projections are polygonal.

7. The protective element of claim 6, wherein the peripheries are regular polygons.

8. The protective element of claim 5, wherein said primary projections are square, and wherein each of said primary projections is oriented at 45 degrees with respect to said base.

9. The protective element of claim 1, wherein said primary projections have flat ends.

10. The protective element of claim 1, wherein the protective element is made of concrete.

11. The protective element of claim 1, wherein the protective element is made of a material that comprises a residue material from oil refining, and at least one of sand, granulate, and gravel.

12. The protective element of claim 1, wherein said opposite planar sides are substantially parallel.

13. The protective element of claim 1, wherein said auxiliary projections each have a pointed shape, with respective distal ends of said auxiliary projections defining a square.

14. The protective element of claim 1, wherein said auxiliary projections each have two flat sides that meet at a point and wherein each of said two flat sides is coplanar with a respective one of said two flat sides of an adjacent one of said auxiliary projections.

15. The protective element of claim 1, wherein said opposite faces of said auxiliary projections are coplanar with said opposite planar sides of said square base.

16. A protective element, comprising:
a substantially square base with opposite planar sides;
two primary projections that each extend from a different respective one of said opposite planar sides, each of said two primary projections being a substantially rectangular parallelepiped; and four auxiliary projections that each extend from a different respective corner of said substantially square base and that are spaced apart from each other by substantially equally sized trapezoidal recesses, each of said four auxiliary projections extending in a direction of a diagonal of said base crossing the respective corner and having a pointed shape defined by two flat surfaces that are each coplanar with a respective adjacent one said two flat surfaces of an adjacent one of said auxiliary projections, said protective element being heavier than water and constructed and arranged to rest on a feature to be protected from breaking waves.

17. The protective element of claim 16, wherein each of said primary projections is oriented at 45 degrees with respect to said base.

18. A protective element, comprising:

a first parallelepiped having a first length measured along a longitudinal axis of said element and a first width that is less than said first length, longitudinal ends of said first parallelepiped being substantially square and substantially parallel to a first plane;

a second parallelepiped having a second length measured along the longitudinal axis of said element and a second width that is greater than said second length, said first length being greater than said second length and said first width being less than said second width, longitudinal ends of said second parallelepiped being substantially square and substantially parallel to the first plane, said first parallelepiped extending symmetrically through a center of said second parallelepiped and being oriented so that longitudinal faces of said first parallelepiped are at 45° to longitudinal faces of said second parallelepiped, each of the longitudinal faces of said second parallelepiped having two coplanar flat areas separated by a trapezoidal recess, said protective element being heavier than water and constructed and arranged to rest on a feature to be protected from breaking waves.

* * * * *